United States Patent Office 2,792,412
Patented May 14, 1957

2,792,412

RECOVERY OF RUTHENIUM FROM AQUEOUS SOLUTIONS

Harold R. Schmidt and Robert Lee Moore, Richland, Wash., assignors to the United States of America as represented by the United States Atomic Energy Commission No Drawing. Application March 4, 1954,
Serial No. 414,235

10 Claims. (Cl. 260—429)

This invention deals with the separation and recovery of ruthenium values from aqueous solutions such as, for instance, ore processing solutions. The process also deals with the separation of ruthenium values from aqueous solutions containing these values together with values of actinides, cerium, zirconium and lanthanum.

The process of this invention, for instance, has been found useful in the processing of so-called dissolver solutions which are the solutions obtained when neutron-irradiated uranium is dissolved in nitric acid. Such dissolver solutions contain uranium, plutonium and fission products. One of the most troublesome fission products is ruthenium, because it is rather difficult to separate it from uranium and plutonium; this is especially true for solvent extraction processes where ruthenium frequently is, at least partly, coextracted with the uranium. Solvent extraction processes as applied to dissolver solutions usually broadly comprise contacting the nitric acid solution with a water-immiscible organic solvent whereby the uranium and plutonium are extracted into an extract phase while the fission products remain in the aqueous solution. However, as has been mentioned above, part of the ruthenium usually is coextracted together with the uranium and plutonium. The plutonium is then reduced to the trivalent state and back-extracted with an aqueous medium; the solvent phase left then contains practically all of the uranium and still the ruthenium originally coextracted. The process of this invention is well suitable to separate the ruthenium from the uranium in such solutions; of course, the ruthenium can also be removed by the process of this invention from the original dissolver solution prior to solvent extraction.

Ruthenium compounds have many uses. For instance, ruthenium chloride is employed for medicinal purposes; ruthenium compounds are also useful as catalysts in chemical processes. Furthermore, ruthenium-containing alloys have been widely used.

Ruthenium can be precipitated, it was found, from aqueous solutions as the sulfide, for instance, by adding copper sulfide, CuS. However, the ruthenium sulfide precipitates formed thereby proved to be relatively unstable with increasing temperature and acidity.

It is an object of this invention to provide a process of precipitating ruthenium in a form which is stable independently of changes of temperature and acidity.

It is another object of this invention to provide a process of separating ruthenium from the above-described type of solutions.

It is another object of this invention to provide a process of recovering ruthenium from aqueous solutions which does not require special, complicated equipment.

It is still another object of this invention to provide a process of recovering ruthenium from aqueous solutions which can be performed in a simple manner and in a relatively short time.

It is finally another object of this invention to provide a process of recovering ruthenium from aqueous solutions which yields a comparatively small volume of waste solution.

It has been found that organic sulfo-compounds, when added to ruthenium-containing acidic aqueous solutions, precipitate ruthenium. It has been found furthermore that if the solution, in addition to ruthenium, also contains one or several of the actinides and/or cerium (in its trivalent or tetravalent form), and lanthanum, none of these values is precipitated so that a separation of ruthenium from these values is accomplished by selective precipitation with the sulfo-compound. These facts were utilized for devising the process of this invention. The recovery of ruthenium by this process usually was between 98 and 99.9%.

The precipitation has to be carried out from an acidic solution. All mineral acids are suitable; however, hydrochloric and nitric acids are preferred. While the process is operative within a wide range of acidity, the lower concentrations proved to be advantageous and a concentration of 0.5 M has been found optimal for either nitric or hydrochloric acid.

The organic sulfo-compounds found best suitable as precipitants are mercaptans, thioethers and disulfides. Excellent results were obtained with 2-mercaptoethanol, β-mercapto propionic acid and 2,3-dimercaptopropanol-1, the latter giving the very best results. Upon addition of the precipitant to the aqueous soluion, an odor of hydrogen sulfide could never be detected, which indicates that there is no hydrolysis taking place of the organic sulfo-compounds and that the ruthenium is not precipitated in the form of a sulfide, but in the form of a true compound between the ruthenium salt and the precipitant.

In many of the solutions to be treated by the process of this invention, in particular in the dissolver solutions, the fission products, and thus also the ruthenium, are present in micro or tracer concentrations. After addition of the sulfo-compound precipitant to such dilute solutions the quantity of the of the ruthenium compound formed still is within solubility limits; in other words, no precipitation takes place from these dilute solutions. In order to make the process of this invention also operative in tracer solutions and obtain practically quantitative precipitation, a so-called carrier-forming substance is added to the solution. Compounds that are suitable as carrier-forming substances are compounds which are soluble in the aqueous solution to be treated and react with the precipitant to form an insoluble compound, the carrier, which then carries the ruthenium compound formed and thus removes it from the solution. Instead of adding a carrier-forming substance and simultaneously precipitating the carrier with the formation of the ruthenium sulfo-compound, the carrier may be preformed and added as such to the solution to be treated. Formation of the carrier precipitate in the solution is the preferred embodiment, however. Salts suitable for the formation of the carrier precipitate are water-soluble, heavy metal compounds, such as compounds of silver, copper (II), mercury (II), and molybdenum (III), or salts of the stable isotopes of ruthenium (III) or ruthenium (IV). The concentration of these salts may vary widely; a satisfactory average concentration is from about 0.01 to 0.1 M.

While zirconium is not precipitated by 2,3-dimercaptopropanol-1, for instance, it was found that in the presence of silver salt zirconium is precipitated or carried. In one instance, a dissolver solution was used containing uranyl nitrate hexahydrate in a concentration of 1.67 M and nitric acid in a concentration of 0.23 M. A quantity of 2,3-dimercaptopropanol-1 was added so as to yield a concentration of 0.05 M and thereafter silver nitrate in a quantity to yield a concentration of 0.025 M. Analysis of the precipitate formed and the remaining solution showed a decontamination factor $$\left(\frac{\text{content in dissolver solution}}{\text{content in remaining solution}}\right)$$

for ruthenium of 203, of 21 for zirconium and of 33 for niobium, while all the uranium remained in solution. This shows that also good decontamination of uranium from zirconium and niobium is obtained by the process of this invention.

The concentration of the organic precipitant, of course, is dependent on the ruthenium content and also on that of the carrier-forming salt. For a concentration of carrier-forming salt of 0.01 M and a ruthenium content of about $14 \times 10^7$ β-counts/min./ml., a concentration ranging from 0.025 to 0.05 M for the precipitant was found suitable.

The precipitant may either be added to the solution prior to admixture of the carrier salt or thereafter. The precipitant may suitably be incorporated into the solution at room temperature; a digestion of several hours at room or elevated temperature, up to 80° C., has been found beneficial, since the precipitate then coagulates and its separation is thus facilitated. Digestion between 50 and 80° C. for from 2 to 3 hours yielded the best results. Separation of the precipitate may be carried out by any means known to those skilled in the art, including decantation, filtration and centrifugation.

In the following, an example is given of the process of this invention for illustrative purposes, without the intention to have the invention limited to the details given therein.

Example

To a solution containing uranyl nitrate hexahydrate in a concentration of 1.7 M, nitric acid in a concentration of 0.5 M, a carrier-forming salt in a concentration of 0.1 M, and ruthenium in a concentration yielding $7 \times 10^6$ β-counts/min./ml., using a 10% geometry and 50% counter efficiency, there was added at room temperature 2,3-dimercaptopropanol-1 in a quantity to yield a concentration of 0.025 M. A number of these tests were carried out, each with different carrier salts. The solutions obtained were digested at 55° C. for 2 hours and the precipitates were then removed by centrifugation and analyzed for ruthenium content. The filtrate was analyzed for the uranium content and the ruthenium decontamination factors were determined from the results obtained. In each instance practically all of the uranium had been retained in the aqueous solution. The decontamination factors (D. F.) for ruthenium (ruthenium content of the original solution divided by the ruthenium content of the filtrate) are given in the table below.

| Carrier-forming salt: | Ruthenium D. F. |
|---|---|
| $AgNO_3$ | 600 |
| $Mo(NO_3)_3$ | 500 |
| $Hg(NO_3)_2$ | 47 |
| $Cu(NO_3)_2$ | 300 |
| $Ru(SO_4)_2$ | 1050 |

The above values indicate that the addition of inactive ruthenium salts is particularly efficient as a carrier-forming salt.

Some dissolver solutions, it was found, contain some nitrite which decomposes, and thus makes ineffective, part of the mercaptan. In order to overcome this disadvantage, so-called nitrite suppressors were added to nitrite-containing solutions. Urea, sulfamic acid, and a mixture of ferrous ammonium sulfate and sulfamic acid were found completely to eliminate the drawback encountered in the presence of nitrite. A concentration of about 0.1 M was sufficient for urea as well as for sulfamic acid, while a concentration of 0.1 M each was satisfactory in the case o fthe sulfamic acid-ferrous ammonium sulfate mixture in dissolver solutions of the usual concentrations.

It will be understood that this invention is not to be limited to the details given herein but that it may be modified within the scope of the appended claims.

What is claimed is:

1. A process of separating ruthenium values from actinide values contained in an aqueous acidic solution comprising adding to said solution an organic compound selected from the group consisting of 2-mercapto-ethanol, beta-mercapto propionic acid and 2,3-dimercaptopropanol-1 whereby said ruthenium values precipitate, and separating the precipitate from the remaining solution.

2. The process of claim 1 in which the aqueous acidic solution contains nitric acid in a concentration of about 0.5 M.

3. The process of claim 1 in which the aqueous acidic solution contains hydrochloric acid in a concentration of about 0.5 M.

4. The process of claim 1 wherein the organic compound is 2,3-dimercaptopropanol-1.

5. The process of claim 1 wherein the organic compound is added in a quantity so as to yield a concentration of 0.025 to 0.05 M in the aqueous solution.

6. The process of claim 1 wherein the aqueous solution with the precipitate formed is allowed to digest for several hours prior to separating the precipitate.

7. The process of claim 6 wherein digestion is carried out at 50 to 80° C. for from 2 to 3 hours.

8. A process of separating ruthenium values from uranium values contained in an aqueous acidic solution containing said ruthenium values in micro amounts, comprising adding a water-soluble carrier-forming mineral acid salt to said solution, said carrier-forming salt being selected from the group consisting of silver salt, copper (II) salt, mercury (II) salt, molybdenum (III) salt and ruthenium salt; adding to said solution an organic compound selected from the group consisting of 2-mercapto-ethanol, beta-mercapto propionic acid and 2,3-dimercaptopropanol-1 whereby said carrier-forming salt and said ruthenium values are precipitated; and separating the precipitate from the remaining solution.

9. The process of claim 8 wherein the carrier-forming salt is added in a quantity so as to yield a concentration of about 0.01 to 0.1 M.

10. A process of separating ruthenium values from an aqueous acidic solution containing said ruthenium values in micro amounts together with actinide metal values, comprising adding a water-soluble carrier-forming mineral acid salt to said solution, said carrier-forming salt being selected from the group consisting of silver salt, copper (II) salt, mercury (II) salt, molybdenum (III) salt and ruthenium salt; adding to said solution an organic compound selected from the group consisting of 2-mercapto-ethanol, beta-mercapto propionic acid and 2,3-dimercaptopropanol-1 whereby said carrier-forming salt and said ruthenium values are precipitated; and separating the precipitate from the actinide values-containing solution.

References Cited in the file of this patent

Claesson: "Journal fur praktische Chemie," vol. 123 (N. F. 15), pp. 193–218, particularly 206–7 (1877).